United States Patent
Noda et al.

(10) Patent No.: US 7,848,187 B2
(45) Date of Patent: Dec. 7, 2010

(54) INFORMATION REPRODUCING/RECORDING APPARATUS

(75) Inventors: Ryusuke Noda, Daito (JP); Tetsuya Shihara, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 631 days.

(21) Appl. No.: 11/893,358

(22) Filed: Aug. 15, 2007

(65) Prior Publication Data

US 2008/0056085 A1 Mar. 6, 2008

(30) Foreign Application Priority Data

Aug. 17, 2006 (JP) .............................. 2006-222791

(51) Int. Cl.
*G11B 7/00* (2006.01)
(52) U.S. Cl. ................................. 369/44.27; 369/47.55
(58) Field of Classification Search .................. None
See application file for complete search history.

(56) References Cited

U.S. PATENT DOCUMENTS

| 6,091,699 | A | 7/2000 | Nakane et al. | |
|---|---|---|---|---|
| 6,185,170 | B1 * | 2/2001 | Yoon et al. | 369/44.29 |
| 7,369,472 | B2 * | 5/2008 | Lee et al. | 369/52.1 |
| 2004/0202074 | A1 * | 10/2004 | Park | 369/47.42 |
| 2008/0013416 | A1 * | 1/2008 | Van Rompaey et al. | 369/44.27 |

FOREIGN PATENT DOCUMENTS

| EP | 1 424 629 A2 | 6/2004 |
|---|---|---|
| EP | 1 580 658 A1 | 9/2005 |
| JP | 2002-358663 | 12/2002 |
| JP | 2002-358673 | 12/2002 |
| JP | 2004-318918 | 11/2004 |
| JP | 2005-243229 | 9/2005 |
| WO | 2006/016338 A1 | 2/2006 |

OTHER PUBLICATIONS

Extended European Search Report for European Application No. 07016219.3-2210, mailed on Dec. 11, 2007 (8 pages).
Patent Abstracts of Japan for Japanese Publication No. 2004-318918, Publication date Nov. 11, 2004 (2 pages).
Patent Abstracts of Japan for Japanese Publication No. 2002-358673, Publication date Dec. 13, 2002 (2 pages).
Patent Abstracts of Japan for Japanese Publication No. 2002-358663, Publication date Dec. 13, 2002 (2 pages).
Patent Abstracts of Japan for Japanese Publication No. 2005-243229, Publication date Sep. 8, 2005 (2 pages).

* cited by examiner

*Primary Examiner*—Joseph Haley
(74) *Attorney, Agent, or Firm*—Osha Liang LLP

(57) ABSTRACT

The present invention provides an information reproducing/recording apparatus capable of executing tracking servo normally in short time at the time of loading an information recording medium. At the time of executing a tracking servo process on a BD (Blu-ray Disc)-R capable of recording information selectively on a land track or a groove track during loading of the BD-R, the polarity of a tracking error signal adapted to trace of the land or the groove is temporarily determined on the basis of statistical information indicative of a result of a statistic taken to see which one of the BD-R that records information on the land track and the BD-R that records information on the groove track is more frequently used. On the basis of the tracking error signal of the polarity, an optical pickup is driven to execute tracking servo.

6 Claims, 5 Drawing Sheets

INFORMATION REPRODUCING/RECORDING APPARATUS

BACKGROUND OF THE INVENTION

1. Field of the Invention

The present invention relates to an information reproducing/recording apparatus for reproducing/recording information from/to a write-once information recording medium to which information can be recorded while selecting either a land track or a groove track.

2. Description of the Related Art

A blu-ray disc (trademark) is one example of information recording medium having a capacity of 20 GB or more. Blu-ray discs include a reproduction-only BD (Blu-ray Disc)-ROM, a write-once BD-R, and a rewritable BD-RE. In the BD-R, information can be recorded by selecting either a track in a land or a track in a groove provided for a recording layer on a substrate.

An information reproducing/recording apparatus for reproducing/recording information from/to a general optical disc as an information recording medium has an optical pickup. For example, the optical pickup condenses a laser beam emitted from a semiconductor laser device by an objective lens, allows the condensed beam to fall on an optical disc, and receives the beam reflected from the optical disc by a light receiving device, thereby reading information recorded in the optical disc. To accurately read information, automatic control called tracking servo for tracing a track in an optical disc in which information is recorded with a light spot formed on the optical disc by a laser beam emitted from the optical pickup is performed. The tracking servo is performed by driving the optical pickup on the basis of a tracking error signal. The tracking error signal is detected by converting light received by a light receiving part divided plurally in the light receiving device to an electric signal and performing arithmetic process on the electric signal. As the detecting method, 3-beam tracking, push-pull tracking, differential push-pull tracking, differential phase tracking, and the like are practically used.

A tracking error signal has a waveform in which the polarities on the right and left sides are opposite to each other with respect to the center as a reference. The polarity of a tracking error signal is determined by the information reproducing/recording apparatus and changes according to the specifications of the optical pickup, the shape of the track of an optical disc, and the like. For example, in the case of detecting a tracking error signal by the push-pull tracking or differential push-pull tracking and tracing a groove as a groove-shaped track in a BD-R with an optical pickup, the side to which the tracking error signal moves when the light spot is shifted to the inner radius side is set as a plus side, and the side to which the tracking error signal moves when the light spot is shifted to the outer radius side is set as a minus side. In the case of detecting the tracking error signal by the same method and tracing a land as a projected track in a BD-R with the optical pickup, the side to which the tracking error signal moves when the light spot is shifted to the inner radius side is set as a minus side, and the side to which the tracking error signal moves when the light spot is shifted to the outer radius side is set as a plus side. That is, in the push-pull tracking or differential push-pull tracking, the polarity of a tracking error signal in the land and that in the groove in the BD-R are opposite to each other.

The tracking servo is executed in accordance with the polarity of tracking error signal determined as described above. Consequently, in the case where the polarity of a tracking error signal is not correctly set in accordance with the track to be traced, even if the deviation direction of the light spot is determined from the movement direction of the tracking error signal, and the driving of the optical pickup is controlled so as to correct the deviation, the movement and the deviation cannot be corrected, and the tracking servo cannot be performed normally, since all of the movement direction, the deviation direction, and the control direction are opposite and wrong. Therefore, to correctly set the polarity of the tracking error signal before execution of the tracking servo, information indicative of a track (land or groove) in which information is recorded, information of the polarity of a tracking error signal for accurately reading information from the track, and the like is recorded in a PIC (Permanent Information and Control data) area provided at the innermost radius part (about 1 mm) of the recording layer of the BD-R. Although it is easy to read the information from the PIC area after a BD-R is loaded and the tracking servo is performed normally, before start of the tracking servo, the optical pickup cannot be moved with precision, and it is very difficult.

Japanese Unexamined Patent Application Publication (JP-A) No. 2005-243229 discloses the technique of reading a groove wobble signal from an information recording medium and determining that the information recording medium is of a land recording type or a groove recording type from the signal. JP-A No. 2002-358663 discloses the technique of detecting either a land or a groove crossed by a light spot on the basis of an accumulated value for a predetermined period of tracking error signals or the like and determining the kind of the track on which the light spot lands after a track jump. JP-A No. 2002-358673 discloses a learning process of counting the number of times of successes in reproduction when a tracking target position is offset to the plus side or minus side in a retry process at the time of reproduction, performing a statistical process, and shifting the optimum offset of the tracking target position to the plus side or the minus side in accordance with the success rate. Further, JP-A No. 2004-318918 discloses the technique of attempting to obtain address information recorded in an information recording medium at the time of controlling the position of an objective lens in the tracking direction and, when the address information cannot be obtained, inverting the polarity of the tracking error signal. In this document, another technique of loading an objective lens position control program from a recording medium such as another optical disc or a memory card or via a network to a flash memory is disclosed.

Before start of tracking servo on an information recording medium such as a BD-R, the position of a light spot is unknown. Consequently, it is very difficult to read a groove wobble signal from an information recording medium like in JP-A No. 2005-243229 or to read address information from an information recording medium like in JP-A No. 2004-318918. Since the polarity of a tracking error signal is not determined correctly, it is very difficult to determine the kind of a track on which the light spot is positioned like in JP-A No. 2002-358663 or to perform the learning process as in JP-A No. 2002-358673.

SUMMARY OF THE INVENTION

An object of the present invention is to provide an information reproducing/recording apparatus capable of normally executing tracking servo in short time at the time of loading of an information recording medium.

The present invention provides an information reproducing/recording apparatus for reproducing/recording information by emitting a laser beam from an optical pickup to a write-once information recording medium capable of recording information selectively to a land track or a groove track provided for a recording layer. The information reproducing/recording apparatus includes: a detector that detects a tracking error signal from a laser beam reflected by the information recording medium; a controller that executes tracking servo by driving the optical pickup on the basis of the tracking error signal detected by the detector; and a recording unit that records statistical information indicative of a result of a statistic taken to see which one of the information recording medium that records information on the land track and the information recording medium that records information on the groove track is more frequently used. At the time of loading the information recording medium, the controller temporarily determines the polarity of the tracking error signal adapted to trace of the land or the groove on the basis of any of the statistical information, and executes the tracking servo.

With the configuration, which one of an information recording medium in which information is recorded on a land track and an information recording medium in which information is recorded on a groove track is more frequently used is determined on the basis of the statistical information. The polarity of a tracking error signal adapted to trace of the track frequently used is temporarily determined, and the tracking servo can be executed. Consequently, even if the type of an information recording medium being loaded and the position of a light spot are unknown before start of tracking servo, when the information recording medium being loaded is of the land recording type or the groove recording type which is more frequently used according to the statistical information and the light spot is positioned in the land or groove determined to be frequently used according to the statistical information, the polarity of the tracking error signal is correctly determined in accordance with the land or groove to be traced by a single try. Thus, the tracking servo can be executed normally in short time at the time of loading the information recording medium. In particular, since the probability that the information recording medium being loaded is an information recording medium of a type which is more frequently used according to the statistical information is high, the probability that the polarity of a tracking error signal is determined correctly by a single try and tracking servo can be executed normally is higher than that in the case of determining the polarity of the tracking error signal without any ground and performing the tracking servo. In the case where the information recording medium being loaded is not an information recording medium of a type which is more frequently used according to the statistical information or the light spot is not positioned on a track which is determined to be frequently used according to the statistical information, the polarity of the tracking error signal cannot be determined correctly and the tracking servo cannot be executed normally by a single try. However, by changing the polarity of the tracking error signal in the second try, the polarity can be determined correctly so as to be adapted to the land or groove to be traced, and the tracking servo can be executed normally in short time. Further, before start of the tracking servo, it is unnecessary to read information and signals from a predetermined area in an information recording medium being loaded and detect the type of the information recording medium and the position of a light spot. Therefore, the number of processes executed before the tracking servo and during loading becomes smaller and the processes are simplified, so that time required for the tracking servo and loading can be shortened.

According to an embodiment of the present invention, in the information reproducing/recording apparatus, when the tracking servo cannot be executed normally, the controller inverts the polarity of the tracking error signal and re-executes the tracking servo.

In the case where the information recording medium being loaded is not an information recording medium of a type which is more frequently used according to the statistical information or the light spot is not positioned on a track which is determined to be frequently used according to the statistical information, the polarity of the tracking error signal cannot be determined correctly and the tracking servo cannot be executed normally by a single try. However, by changing the polarity of the tracking error signal in the second try, the polarity can be determined correctly so as to be adapted to the land or groove to be traced, and the tracking servo can be executed normally in short time.

According to an embodiment of the present invention, the information reproducing/recording apparatus is provided with an obtaining/updating unit that obtains the latest statistical information from the management server that records and manages the latest statistical information, and updates the statistical information in the recording unit with the obtained latest statistical information. The information reproducing/recording apparatus is also provided with a reading/updating unit that reads the latest statistical information from an information recording medium which records the latest statistical information and is distributed, and updates the statistical information in the recording unit with the read latest statistical information.

With the configuration, the probability that the information recording medium being loaded is an information recording medium of a type which is more frequently used according to the latest statistical information becomes higher. Thus, the probability that the polarity of a tracking error signal is determined correctly and tracking servo can be executed normally in short time by a single try becomes higher.

According to an embodiment of the present invention, the information reproducing/recording apparatus further includes a generating unit that detects the information recording track of the information recording medium on which the tracking servo can be normally executed, which is either the land track or the groove track, and records the detection result in the recording unit whenever necessary, thereby generating the statistical information peculiar to the information reproducing/recording apparatus.

With the configuration, the type of an information recording medium handled more frequently in the information reproducing/recording apparatus is determined on the basis of the statistical information peculiar to the information reproducing/recording apparatus, the polarity of the tracking error signal adapted to the type is temporarily determined, and the tracking servo can be executed. Consequently, the probability that the information recording medium being loaded is an information recording medium of a type which is more frequently used according to the peculiar statistical information becomes higher. Thus, the probability that the polarity of a tracking error signal is determined correctly and tracking servo can be executed normally in short time by a single try becomes higher.

According to an embodiment of the present invention, the information reproducing/recording apparatus further includes: an input unit that enters identification information peculiar to the user; and an identifying unit that identifies the user on the basis of the identification information. The generating unit generates the peculiar statistical information for each of users and records the peculiar statistical information in the recording unit, and the controller temporarily determines the polarity of the tracking error signal on the basis of the statistical information peculiar to each user and executes the tracking servo.

With the configuration, which one of an information recording medium in which information is recorded on a land track and an information recording medium in which information is recorded on a groove track is handled more frequently is determined on the basis of the statistical information peculiar to the user of the information reproducing/recording apparatus, the polarity of the tracking error signal according to trace of the track determined is temporarily determined, and the tracking servo can be executed. Consequently, the probability that the information recording medium being loaded is an information recording medium of a type which is more frequently used according to the statistical information peculiar to the user becomes higher. Thus, the probability that the polarity of a tracking error signal is determined correctly and tracking servo can be executed normally in short time by a single try becomes higher.

Further, according to a typical embodiment of the present invention, an information reproducing/recording apparatus for reproducing/recording information by emitting a laser beam from an optical pickup to a BD (Blu-ray Disc)-R capable of recording information selectively to a land track or a groove track provided for a recording layer and recording characteristic information in a predetermined area includes: a detector that detects a tracking error signal from a laser beam reflected by the BD-R; a controller that executes tracking servo by driving the optical pickup on the basis of the tracking error signal detected by the detector; a recording unit that records statistical information indicative of a result of a statistic taken to see which one of the BD-R that records information on the land track and the BD-R that records information on the groove track is more frequently used; an updating unit that obtains the latest statistical information recorded in a management server or an information recording medium and updates the statistical information in the recording unit with the obtained latest statistical information; and a generating unit that generates the statistical information peculiar to the information reproducing/recording apparatus and records the statistical information in the recording unit. At the time of loading the BD-R, the controller temporarily determines the polarity of the tracking error signal adapted to trace of the land or the groove on the basis of any of the statistical information in the recording unit, executes the tracking servo, when the tracking servo cannot be executed normally, inverts the polarity of the tracking error signal, re-executes the tracking servo, and when the tracking servo can be executed normally, reads the characteristic information by the optical pickup. The generating unit detects the information recording track of the BD-R on which the tracking servo can be normally executed, which is either the land track or the groove track, and records the detection result in the recording unit whenever necessary, thereby generating the peculiar statistical information.

With the configuration, which one of a BD-R that records information on the land track and a BD-R that records information on the groove track is used more frequently is determined on the basis of the statistical information, the polarity of the tracking error signal adapted to trace of the track of the determined BD-R is temporarily determined, and the tracking servo can be executed. Consequently, even when the type of the BD-R being loaded and the position of the light spot are unknown before start of the tracking servo, if the BD-R being loaded is of the land recording type or the groove recording type which is determined to be more frequently used according to the statistical information and the light spot is positioned on the land or groove which is determined to be more frequently used according to the statistical information, the polarity of the tracking error signal is correctly determined so as to be adapted to the land or groove to be traced by a single try, and tracking servo can be executed normally in short time at the time of loading the BD-R. In particular, since the probability that the BD-R being loaded is the BD-R of the type determined to be more frequently used according to the statistical information is high, the probability that the tracking servo can be executed normally by correctly determining the polarity of the tracking error signal by a single try can be made higher than that in the case where the polarity of the tracking error signal is determined without any ground and tracking servo is executed. In the case where the BD-R being loaded is not of the type determined to be used more frequently according to the statistical information or in the case where the light spot is not positioned on the track which is determined to be more frequently used according to the statistical information, the polarity of the tracking error signal cannot be determined correctly by a single try and the tracking servo cannot be executed normally. However, by inverting the polarity of the tracking error signal in the second try, the polarity can be determined reliably and accurately so as to be adapted to a land or groove to be traced, and tracking servo can be executed normally in short time. Before start of the tracking servo, it is unnecessary to read information and signals from the PIC area, the user data area, and the like of a BD-R being loaded to detect the type of the BD-R and the position of a light spot. Consequently, the number of processes executed before the tracking servo and during loading is small and the processes are simple, so that time required for the tracking servo and loading can be shortened. Since the latest statistical information is obtained from the management server or the information recording media to update the statistical information in the recording unit, the probability that the BD-R being loaded is the BD-R of the type determined to be more frequently used according to the latest statistical information becomes higher. Thus, it is possible, with higher probability, that the polarity of the tracking error signal is determined accurately and tracking servo is executed normally in short time by a single try. Further, since the statistical information peculiar to the information reproducing/recording apparatus is generated and recorded in the recording unit, the type of a BD-R handled more frequently by the information reproducing recording apparatus is determined on the basis of the peculiar statistical information, the polarity of the tracking error signal adapted to the type is temporarily determined, and the tracking servo can be executed. Consequently, the probability that the BD-R being loaded is a BD-R of a type determined to be frequently used according to the peculiar statistical information becomes higher. Thus, it is possible, with higher probability, that the polarity of the tracking error signal is determined accurately and tracking servo is executed normally in short time by a single try.

According to the present invention, which one of an information recording medium that records information on a land track and an information recording medium that records information on a groove track is more frequently used is determined on the basis of the statistical information, the polarity of the tracking error signal adapted to the information recording medium which is more frequently used is temporarily determined, and the tracking servo can be executed. Consequently, the polarity of the tracking error signal is determined accurately and, at the time of loading an information recording medium, tracking servo can be executed normally in short time.

DESCRIPTION OF THE PREFERRED EMBODIMENTS

Figure 1:
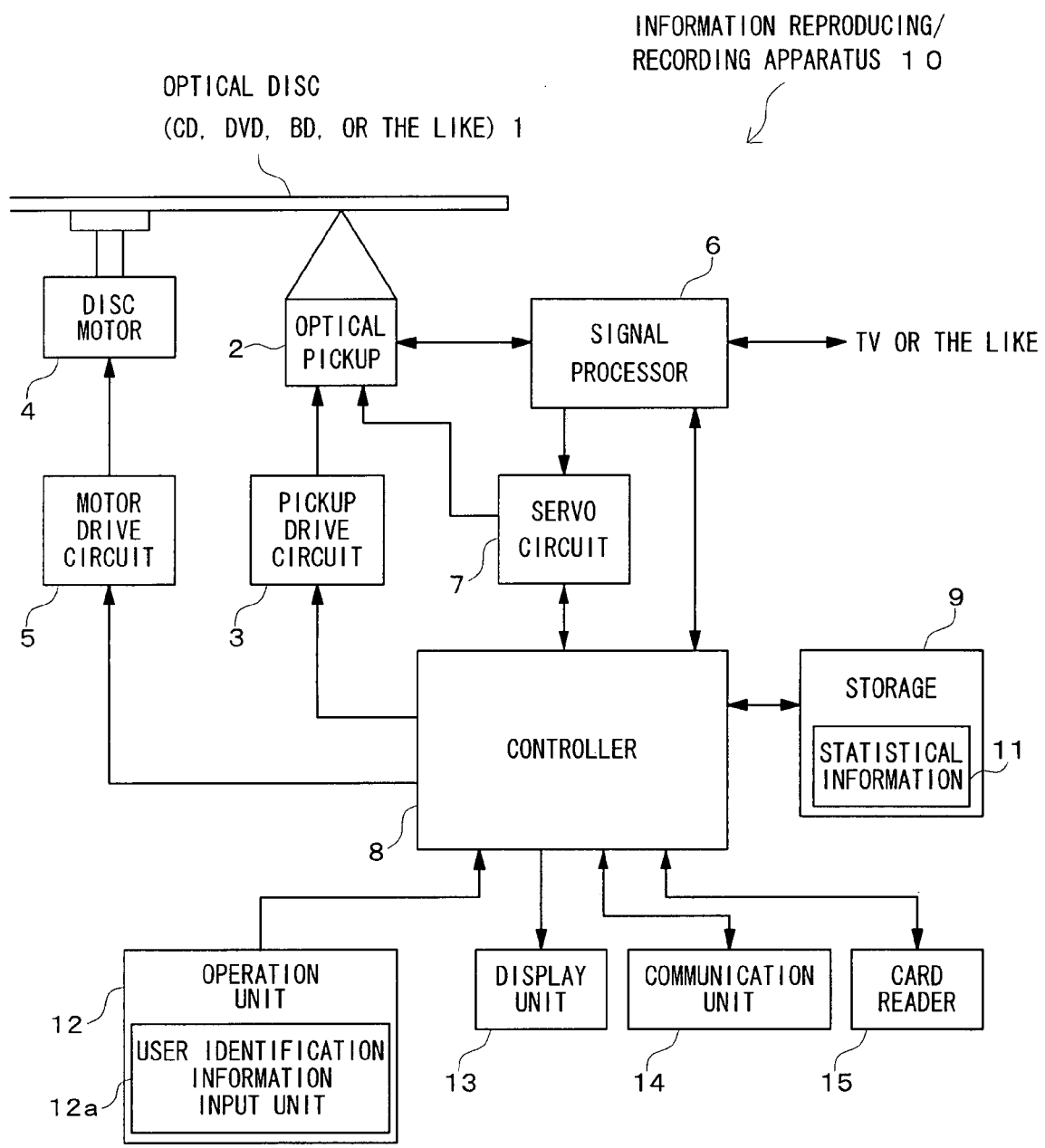
FIG. 1 is an electric block diagram of an information recording/reproducing apparatus according to an embodiment of the present invention.

FIG. 1 is an electric block diagram of an information reproducing/recording apparatus 10 according to an embodiment of the present invention. An optical disc 1 is a CD (Compact Disc), a DVD (Digital Versatile Disc), a BD (Blu-ray Disc), or the like. An optical pickup 2 is made by optical parts such as a semiconductor laser device, an objective lens, a light receiving element, and an actuator for moving the objective lens or the optical pickup itself, and the like. In the optical pickup 2, a laser beam emitted from the semiconductor laser device is condensed by the objective lens and emitted to the optical disc 1. The laser beam reflected from the optical disc 1 is received by the light receiving element and converted to an electric signal to be output. A pickup drive circuit 3 drives electric parts such as the semiconductor laser device and the light receiving element of the optical pickup 2. The pickup drive circuit 3 also drives the actuator in the optical pickup 2 to move the optical pickup 2 in the radial direction of the optical disc 1.

A disc motor 4 rotates the optical disc 1. A motor drive circuit 5 drives the disc motor 4. A signal processor 6 performs arithmetic process on an electric signal output from the optical pickup 2 to detect a focusing error signal (hereinbelow, called "FE signal"), a tracking error signal (hereinbelow, called "TE signal"), a reproduction signal of information recorded on the optical disc 2 (hereinbelow, called "RF signal"), an address signal indicative of an address in a user data area (hereinbelow, called "AD signal"), and the like. The TE signal is detected by the push-pull method or differential push-pull method. The FE signal, RF signal, and AD signal are detected by a known detecting method. Information of a video image and sound based on the detected RF signal is reproduced and output by a TV (television) receiver, or the like. The signal processor 6 processes signals of a video image and sound transmitted from a TV or the like so that the processed signals can be recorded to the optical disc 1. The optical pickup 2 records information to the optical disc 1 on the basis of the signal processed by the signal processor 6.

A servo circuit 7 drives the optical pickup 2 on the basis of the FE signal or TE signal detected by the signal processor 6 to perform focusing servo or tracking servo. The focusing servo is an automatic control of driving the actuator of the optical pickup 2 to make the objective lens slightly reciprocate in the direction perpendicular to the optical disc 1, thereby adjusting the focal point of a light spot irradiated on the optical disc 1 to the recording layer of the optical disc 1. The tracking servo is an automatic control of driving the actuator of the optical pickup 2 to make the objective lens slightly reciprocate in the radial direction of the optical disc 1, thereby tracing a track in a land or a groove provided for the recording layer of the optical disc 1 with a light spot.

Figure 3:
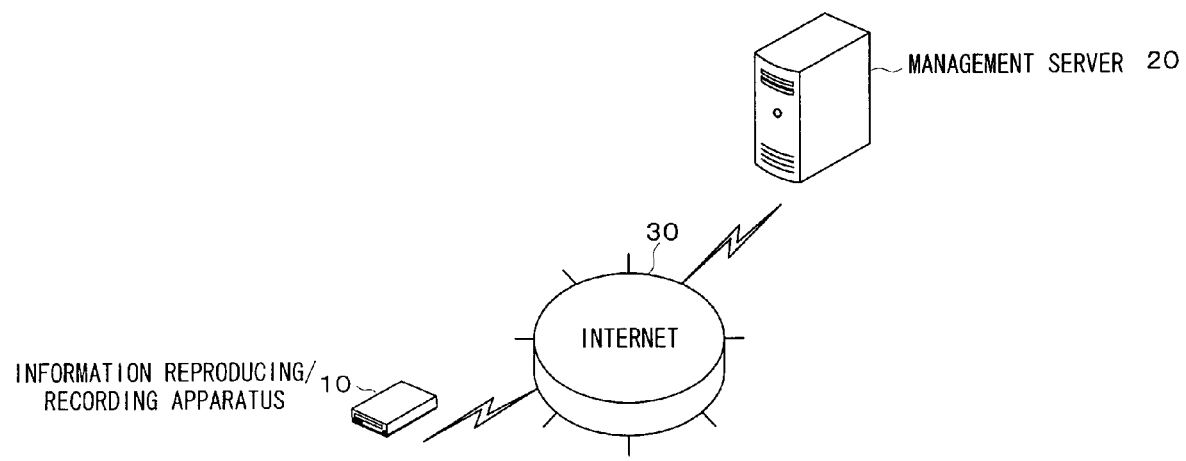
FIG. 3 is an image diagram showing acquisition of the latest statistical information in the apparatus.

A controller 8 is made by a microcomputer and controls the components. A storage 9 is a nonvolatile memory or the like. In the storage 9, statistical information 11 indicative of a result of a statistic taken to find which one of a BD-R that records information on a land track and a BD-R that records information on a groove track is more frequently used is recorded. A BD-R is an example of a write-once information recording medium capable of recording information to a selected track in a land or a groove provided for the recording layer. An operation unit 12 is made by an operation panel provided for the body of the information reproducing/recording apparatus 10, a remote controller, and a user identification information input unit 12a. The operation panel and the remote controller are provided with various buttons and keys for operating the information reproducing/recording apparatus 10. The user identification information input unit 12a is provided to make the user of the information reproducing/recording apparatus 10 input the identification information peculiar to the user. The user identification information input unit 12a is, for example, keys for entering an identification code as the identification information or a biometrics reader for entering biometric information such as a fingerprint. The keys of the remote controller or the operation panel and the like may be also used as the user identification information input unit 12a. A display unit 13 may be formed by a VFD (Vacuum Fluorescent Display), an LED (Light Emitting Diode), or the like. A communication unit 14 is constructed by a circuit connected to an external device such as a TV and a circuit connected to a network such as the Internet 30 (FIG. 3). A card reader 15 reads information from a small memory card 19 (FIG. 4) such as a MEMORY STICK (trademark) or an SD (trademark) card.

Figure 2:
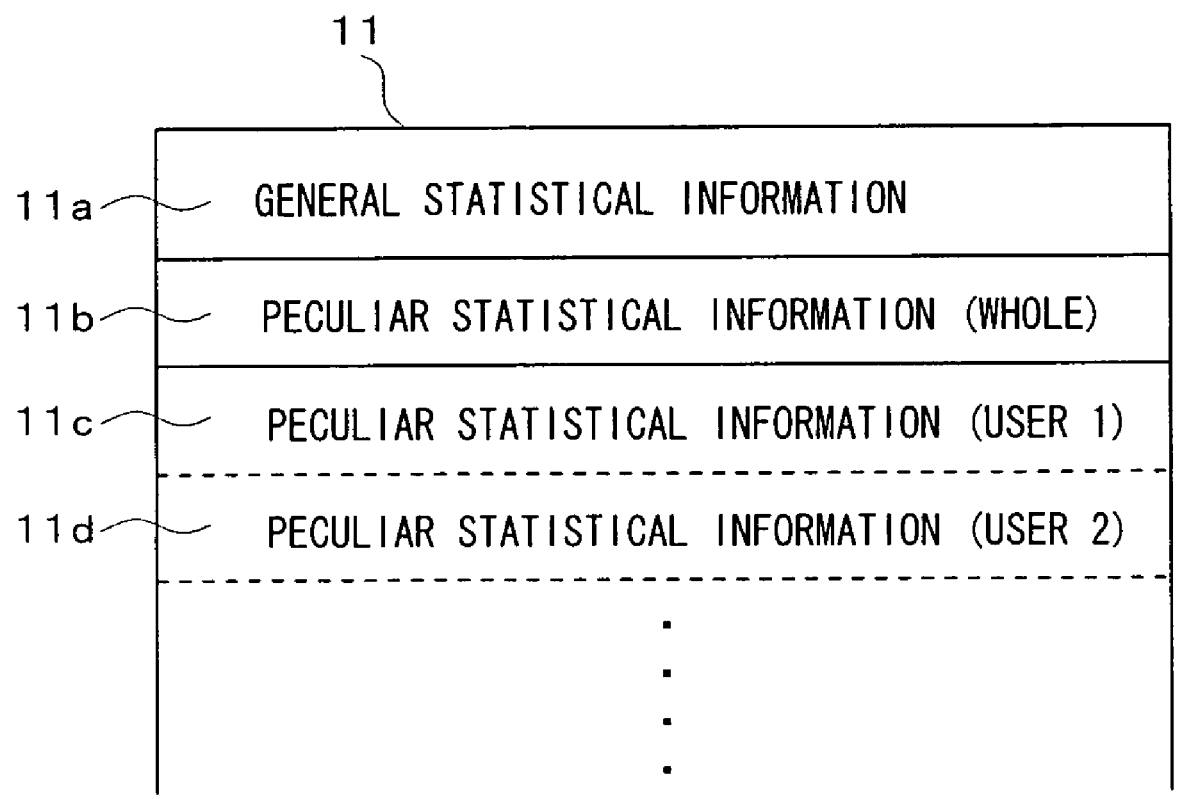
FIG. 2 is a diagram showing an example of statistical information recorded in the apparatus.
Figure 4:
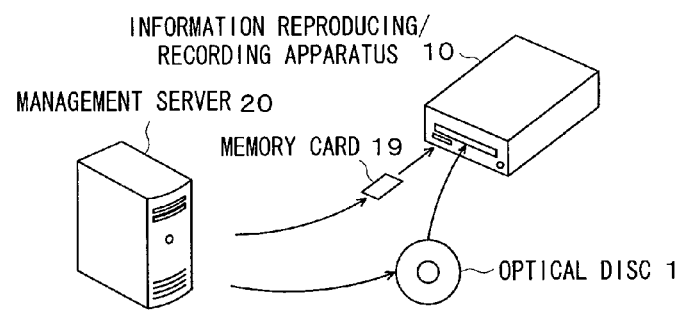
FIG. 4 is an image diagram showing acquisition of the latest statistical information in the apparatus.

FIG. 2 is a diagram showing an example of the statistical information 11 recorded on the storage 9. The statistical information 11 includes general statistical information 11a and peculiar statistical information 11b, 11c, 11d, . . . . The general statistical information 11a shows the result of a statistic taken by the manufacturer of the information reproducing/recording apparatus 10 or a service company on general people to see which one of a BD-R that records information on the land track and a BD-R that records information on the groove track is more frequently used. At the stage of manufacturing the information reproducing/recording apparatus 10, the general statistical information 11a is recorded on the storage 9. In a manufacturer or service company, a management server 20 shown in FIGS. 3 and 4 is equipped. The management server 20 records the latest general statistical information 11a and manages it. In the case of connecting the information reproducing/recording apparatus 10 to the management server 20 via the Internet 30 as shown in FIG. 3 when the information reproducing/recording apparatus 10 is used by the user, the controller 8 downloads the latest general statistical information 11a from the management server 20 by the communication unit 14, and overwrites the general statistical information 11a in the storage 9 with the downloaded information, thereby updating the general statistical information 11a. The latest general statistical information 11a is distributed from the management server 20 by being copied to an information recording medium such as the memory card 19 or the optical disc 1 as shown in FIG. 4. When the memory card 19 or optical disc 1 is loaded in a loading part of the information reproducing/recording apparatus 10, the controller 8 reads the latest general statistical information 11a from the memory card 19 or the optical disc 1 by the card reader 15, the optical pickup 2, or the like, and overwrites the general statistical information 11a in the storage 9 with the read information, thereby updating the general statistical information 11a.

The peculiar statistical information (whole) 11b of FIG. 2 shows the result of a statistic taken on all of BDs-R handled by the information reproducing/recording apparatus 10 to see which one of a BD-R that records information on a land track and a BD-R that records information on a groove track is more frequently used. The peculiar statistical information (user 1) 11c, the peculiar statistical information (user 2) 11d, . . . shows the result of statistics taken on the BDs-R handled for each user identified by the information reproducing/recording apparatus 10 to see which one of a BD-R that records information on a track of a land and a BD-R that records information on a track of a groove is more frequently used. Based on the identification information peculiar to the user entered by the user identification information input unit 12a, the controller 8 identifies the user of the information reproducing/recording apparatus 10. When the tracking servo can be executed normally on a BD-R loaded in the information reproducing/recording apparatus 10, the controller 8 detects which one of the land and the groove having the track recording the information of the BD-R and records the detection result in the storage 9 in a lump or on the user unit basis whenever necessary. In such a manner, the peculiar statistical information (whole) 11b peculiar to the reproducing/recording apparatus 10 or the peculiar statistical information 11c, 11d, . . . for the respective users is generated and updated whenever necessary.

In the above, the signal processor 6 is an embodiment of the detector in the present invention. The controller 8 is an embodiment of the controller, identifying unit, updating unit, obtaining/updating unit, reading/updating unit, and generating unit in the present invention. The storage 9 is an embodiment of the recording unit in the present invention. The user identification information input unit 12a is an embodiment of the input unit in the present invention.

Figure 5:
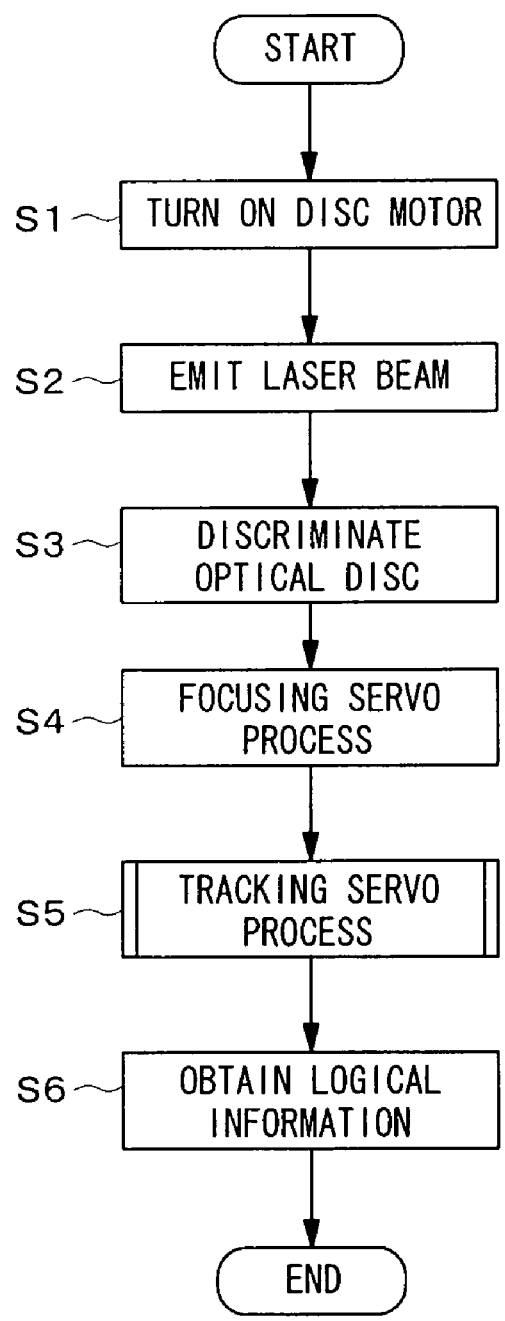
FIG. 5 is a flowchart of a loading process in the apparatus.

FIG. 5 is a flowchart showing the procedure of the process of loading the optical disc 1 performed in the information reproducing/recording apparatus 10. Each step is executed by the controller 8. When the optical disc 1 is loaded in the information reproducing/recording apparatus 10, the controller 8 drives the disc motor 4 (step S1) to rotate the optical disc 1. Next, the controller 8 makes the semiconductor laser device in the optical pickup 2 emit a laser beam (step S2) to irradiate it on the optical disc 1, receives the laser beam reflected from the optical disc 1 by the light receiving device of the optical pickup 2 and, on the basis of a signal output from the light receiving device, determines the kind of the disc 1 (step S3). For example, the output signal from the light receiving device is processed by the signal processor 6 to detect the reflectance of the laser beam, the amplitude level of the output signal, or the like and, on the basis of the reflectance, the amplitude level, or the like, determines the kind of the optical disc 1. The controller 8 executes the focusing servo process and the tracking servo process in accordance with the kind of the optical disc 1 (steps S4 and S5).

When the focusing servo process and the tracking servo process are executed normally, the controller 8 obtains logical information (step S6) and finishes the loading process. The logical information includes specification information such as the kind, capacity, and the like of the optical disc 1 recorded in a predetermined area in the optical disc 1, characteristic information such as the name of a track recording the information, the polarity of a TE signal, optimum light reflectance, laser power, and the like, and control information such as optimum adjustment values for the components detected in the focusing servo process and the tracking servo process. Therefore, concretely, in step S6, the controller 8 reads the specification information and characteristic information of the optical disc 1 from the predetermined area in the optical disc 1, stores it, and stores the control information of the components. After the loading process is finished, the controller 8 executes process of reproducing/recording information from/to the optical disc 1 on the basis of the logical information obtained in such manner.

Figure 6:
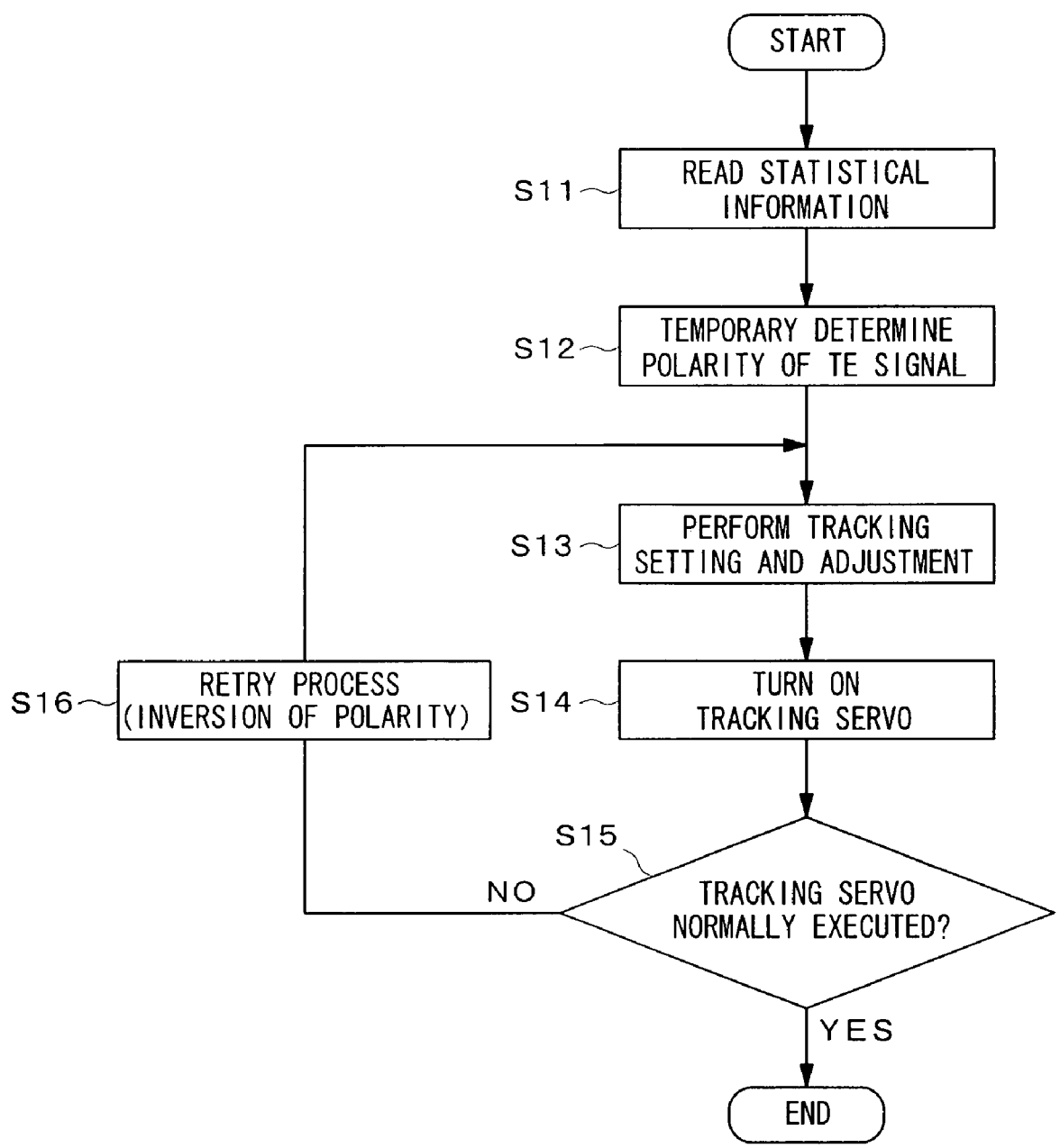
FIG. 6 is a flowchart of a BD-R tracking servo process in the apparatus.

FIG. 6 is a flowchart showing the procedure of the tracking servo process for a BD-R performed in the information reproducing/recording apparatus 10. Each step is executed by the controller 8. When it is determined in step S3 of FIG. 5 that the optical disc 1 is a BD-R, the controller 8 executes in step S5 the tracking servo process for the BD-R in accordance with the flowchart of FIG. 6. First, the controller 8 reads the statistical information 11 in the storage 9 (step S11). In the case where the number of pieces of the peculiar statistical information 11b, 11c, 11d, . . . is small, or in the case where the user preliminarily designates the general statistical information 11a as information to be read by operating the operation unit 12, the controller 8 reads the general statistical information 11a. In the case where the number of pieces of the peculiar statistical information (whole) 11b is large to some extent and the number of pieces of the other peculiar statistical information (user) 11c, 11d, . . . is small, or in the case where the number of pieces of the peculiar statistical information (whole) 11b is large to some extent but the user cannot be identified, or in the case where the peculiar statistical information (whole) 11b is preliminarily designated as information to be read, or the like, the controller 8 reads the peculiar statistical information (whole) 11b. Further, in the case where the user is already identified and the number of pieces of the peculiar statistical information (user) 11c, 11d, . . . for the user is large to some extent, or the like, the controller 8 reads the peculiar statistical information (user) 11c, 11d, . . . .

Next, the controller 8 determines which one of a BD-R that records information on a land track and a BD-R that records information on a groove track is more frequently used on the basis of the read statistical information 11, and temporarily determines the polarity of a TE signal adapted to tracing of the track of the determined BD-R (step S12). The controller 8 then performs tracking setting and adjustment as preparation for tracing the land or groove of the determined BD-R (step S13). Concretely, the controller 8 sets the polarity of the TE signal temporarily determined in step S12 in the signal processor 6 and adjusts another parameter value such as a laser beam irradiation power. After the tracking setting and adjustment is performed, the controller 8 drives the optical pickup 2 on the basis of the TE signal detected by the signal processor 6 to execute tracking servo (step S14).

Then the controller 8 determines whether the tracking servo can be normally executed or not on the basis of the TE signal (step S15). When a BD-R being loaded is of a land recording type or groove recording type determined to be more frequently used according to the statistical information 11 and the light spot is positioned on the land or groove determined according to the statistical information 11, the balance of the TE signal is good, that is, the deviation amount between the center of the TE signal and a reference GND (ground) lies within a permissible range. Therefore, the controller 8 determines that the tracking servo can be executed normally (YES in step S15) and finishes the tracking servo process.

On the other hand, when the BD-R being loaded is not of the type determined to be more frequently used according to the basis of the statistical information 11, or when the light spot is not positioned in the track of the BD-R determined according to the statistical information 11, the balance of the TE signal is not good, that is, the deviation amount between the center of the TE signal and the reference GND is out of the permissible range. Therefore, the controller 8 determines that the tracking servo cannot be executed normally (NO in step S15), and a retry process of inverting the polarity of the TE signal or the like is executed (step S16). The controller 8 then performs the tracking setting and adjustment again on the basis of the retry process (step S13). Further, the controller 8 re-executes the tracking servo on the basis of a TE signal whose polarity is inverted (step S14). When it is determined that the tracking servo can be normally executed (YES in step S15), the controller 8 finishes the tracking servo process.

After that, the controller 8 obtains the logical information from the PIC area in the BD-R being loaded or the like (step S6 in FIG. 5), determines the kind and type (information indicating which one of the land and groove information is recorded) of the BD-R, the polarity of the TE signal, and the like from the characteristic information included in the logical information, records the type in the peculiar statistical information 11b, 11c, 11d, ... in the storage 9, and finishes the loading process. Furthermore, after that, the controller 8 executes processes of reproducing/recording information from/to the optical disc 1 on the basis of the logical information.

According to the above-described manner, which one of a BD-R that records information on the land track and a BD-R that records information on the groove track is used more frequently is determined, the polarity of the TE signal adapted to tracing of the track of the determined BD-R is temporarily determined, and the tracking servo can be executed. Consequently, even when the type of the BD-R being loaded and the position of the light spot are unknown before start of the tracking servo, if the BD-R being loaded is of the land recording type or the groove recording type which is determined to be more frequently used according to the statistical information and the light spot is positioned on the land or groove which is determined to be more frequently used according to the statistical information, the polarity of the TE signal is correctly determined so as to be adapted to the land or groove to be traced by a single try, and tracking servo can be executed normally in short time at the time of loading the BD-R. In particular, since the probability that the BD-R being loaded is the BD-R of the type determined to be more frequently used according to the statistical information is high, the probability that the tracking servo can be executed normally by correctly determining the polarity of the TE signal by a single try can be made higher than that in the case where the polarity of the TE signal is determined without any ground and tracking servo is executed.

In the case where the BD-R being loaded is not of the type determined to be more frequently used according to the statistical information or in the case where the light spot is not positioned on the track which is determined to be more frequently used according to the statistical information, the polarity of the TE signal cannot be determined correctly by a single try and the tracking servo cannot be executed normally. However, by inverting the polarity of the TE signal in the second try, the polarity can be determined reliably and accurately so as to be adapted to a land or groove to be traced, and tracking servo can be executed normally in short time.

Before start of the tracking servo, it is unnecessary to read information and signals from the PIC area, the user data area, and the like of a BD-R being loaded to detect the type of the BD-R and the position of a light spot. Thus, the number of processes executed before the tracking servo and during loading is small and simple, so that time required for the tracking servo and loading can be shortened.

Since the latest general statistical information 11a is obtained from the management server 20 or the information recording media 1 and 19 to update the general statistical information 11a in the storage 9, the probability that the BD-R being loaded is the BD-R of the type determined to be more frequently used according to the latest general statistical information 11a becomes higher. Thus, it is possible, with higher probability, that the polarity of the TE signal is determined accurately and tracking servo is executed normally in short time by a single try.

Since the statistical information 11b, 11c, 11d, peculiar to the information reproducing/recording apparatus 10 is generated and recorded in the storage 9, the type of a BD-R frequently handled by the information reproducing recording apparatus 10 is determined on the basis of the peculiar statistical information 11b, 11c, 11d, ..., the polarity of the TE signal according to the type is temporarily determined, and the tracking servo can be executed. Therefore, the probability that the BD-R being loaded is a BD-R of a type frequently loaded in the information reproducing/recording apparatus 10 and determined to be more frequently used according to the peculiar statistical information 11b, 11c, 11d, becomes higher. Thus, it is possible, with higher probability, that the polarity of the TE signal is determined accurately and tracking servo is executed normally in short time by a single try.

Further, which one of a BD-R that records information on a land track and a BD-R that records information on a groove track is more frequently used is determined according to the peculiar statistical information 11c, 11d, ... peculiar to the users of the information reproducing/recording apparatus 10, the polarity of the TE signal adapted to tracing of the track of the BD-R which is more frequently used is temporarily determined, and the tracking servo can be executed. Consequently, the probability that the BD-R being loaded is a BD-R of a type determined to be more frequently used according to the statistical information 11c, 11d, ... peculiar to the users. Thus, it is possible, with higher probability, that the polarity of the TE signal is determined accurately and tracking servo is executed normally in short time by a single try.

The present invention can employ not only the foregoing embodiment but also various modes. For example, in the foregoing embodiment, as the statistical information 11, the general statistical information 11a, the whole peculiar statistical information 11b, the peculiar statistical information 11c, 11d, ... peculiar to the users is stored in the storage 9. The present invention is not limited to the embodiment. At least one piece of the statistical information may be recorded in the storage 9.

In the foregoing embodiment, when the TE signal has good balance, it is determined that tracking servo can be normally executed. However, the present invention is not limited to the embodiment. It can be also determined that tracking servo can be normally executed, for example, when the level of an RF signal detected by the signal processor 6 exceeds a threshold, or when an AD signal is detected by the signal processor 6.

In the foregoing embodiment, the present invention is applied to the information reproducing/recording apparatus 10 of a multiple type capable of reproducing/recording information from/to a CD, a DVD, a BD, and the like. However the present invention can be also applied to the other information reproducing/recording apparatuses such as a reproduction-only apparatus capable of only reproducing a plurality of kinds of optical discs and a reproducing/recording apparatus dedicated to a BD.

What is claimed is:

1. An information reproducing/recording apparatus for reproducing/recording information by emitting a laser beam from an optical pickup to a BD (Blu-ray Disc)-R capable of recording information selectively to a land track or a groove track provided for a recording layer and recording characteristic information in a predetermined area, comprising:
   a detector that detects a tracking error signal from a laser beam reflected by the BD-R;
   a controller that executes tracking servo by driving the optical pickup on the basis of the tracking error signal detected by the detector;
   a recording unit that records statistical information indicative of a result of a statistic taken to see which one of the BD-R that records information on the land track and the BD-R that records information on the groove track is more frequently used;
   an updating unit that obtains the latest statistical information recorded in a management server or an information recording medium and updates the statistical information in the recording unit with the obtained latest statistical information; and
   a generating unit that generates the statistical information peculiar to the information reproducing/recording apparatus and records the statistical information in the recording unit,
   wherein at the time of loading the BD-R, the controller temporarily determines the polarity of the tracking error signal adapted to trace of the land or the groove on the basis of any of the statistical information in the recording unit, executes the tracking servo, when the tracking servo cannot be executed normally, inverts the polarity of the tracking error signal, re-executes the tracking servo, and when the tracking servo can be executed normally, reads the characteristic information by the optical pickup, and
   the generating unit detects the information recording track of the BD-R on which the tracking servo can be normally executed, which is either the land track or the groove track, and records the detection result in the recording unit whenever necessary, thereby generating the peculiar statistical information.

2. An information reproducing/recording apparatus for reproducing/recording information by emitting a laser beam from an optical pickup to a write-once information recording medium capable of recording information selectively to a land track or a groove track provided for a recording layer, comprising:
   a detector that detects a tracking error signal from a laser beam reflected by the information recording medium;
   a controller that executes tracking servo by driving the optical pickup on the basis of the tracking error signal detected by the detector;
   a recording unit that records statistical information indicative of a result of a statistic taken to see which one of the information recording medium that records information on the land track and the information recording medium that records information on the groove track is more frequently used; and
   a generating unit that generates the statistical information peculiar to the information reproducing/recording apparatus and records the statistical information in the recording unit,
   wherein at the time of loading the information recording medium, the controller temporarily determines the polarity of the tracking error signal adapted to trace of the land or the groove on the basis of any of the statistical information, and executes the tracking servo, and
   the generating unit detects the information recording track of the information recording medium on which the tracking servo can be normally executed, which is either the land track or the groove track, and records the detection result in the recording unit whenever necessary, thereby generating the peculiar statistical information.

3. The information reproducing/recording apparatus according to claim 2, wherein when the tracking servo cannot be executed normally, the controller inverts the polarity of the tracking error signal, and re-executes the tracking servo.

4. The information reproducing/recording apparatus according to claim 2, further comprising an obtaining/updating unit that obtains the latest statistical information from a management server that records and manages the latest statistical information, and updates the statistical information in the recording unit with the obtained latest statistical information.

5. The information reproducing/recording apparatus according to claim 2, further comprising a reading/updating unit that reads the latest statistical information from an information recording medium which records the latest statistical information and is distributed, and updates the statistical information in the recording unit with the read latest statistical information.

6. The information reproducing/recording apparatus according to claim 2, further comprising:
   an input unit that enters identification information peculiar to the user; and
   an identifying unit that identifies the user on the basis of the identification information,
   wherein the generating unit generates the peculiar statistical information for each of users and records the peculiar statistical information in the recording unit, and
   the controller temporarily determines the polarity of the tracking error signal on the basis of the statistical information peculiar to each user and executes the tracking servo.

* * * * *